United States Patent
Ward

(10) Patent No.: US 8,120,308 B2
(45) Date of Patent: Feb. 21, 2012

(54) SOLAR PANEL CHARGING SYSTEM FOR ELECTRIC VEHICLE THAT CHARGES INDIVIDUAL BATTERIES WITH DIRECT PARALLEL CONNECTIONS TO SOLAR PANELS

(76) Inventor: Thomas A. Ward, Moraga, CA (US)

( * ) Notice: Subject to any disclaimer, the term of this patent is extended or adjusted under 35 U.S.C. 154(b) by 0 days.

(21) Appl. No.: 12/980,693

(22) Filed: Dec. 29, 2010

(65) Prior Publication Data

US 2011/0089887 A1 Apr. 21, 2011

Related U.S. Application Data

(63) Continuation-in-part of application No. 12/033,591, filed on Feb. 19, 2008, now Pat. No. 7,884,569, which is a continuation of application No. PCT/US2006/033166, filed on Aug. 23, 2006.

(60) Provisional application No. 60/710,996, filed on Aug. 24, 2005, provisional application No. 60/714,688, filed on Sep. 6, 2005, provisional application No. 60/816,956, filed on Jun. 27, 2006, provisional application No. 61/291,700, filed on Dec. 31, 2009.

(51) Int. Cl.
*H01M 10/44* (2006.01)
*H01M 10/46* (2006.01)
*H02J 7/00* (2006.01)

(52) U.S. Cl. .......... 320/101; 180/2.1; 180/2.2; 320/103; 320/104

(58) Field of Classification Search .................... 320/101
See application file for complete search history.

(56) References Cited

U.S. PATENT DOCUMENTS

| | | | |
|---|---|---|---|
| 3,928,791 A | 12/1975 | Mullersman | |
| 4,090,577 A | 5/1978 | Moore | |
| 4,489,242 A | 12/1984 | Worst | |
| 4,564,799 A * | 1/1986 | Iwaki et al. | 320/101 |
| 4,602,694 A | 7/1986 | Weldin | |
| 5,316,101 A * | 5/1994 | Gannon | 180/221 |
| 5,617,004 A | 4/1997 | Kaneko | |

(Continued)

FOREIGN PATENT DOCUMENTS

FR  2830689 A1 * 4/2003

(Continued)

OTHER PUBLICATIONS

Green Car Congress, "Solar-Power-Augmented Prius Takes the Grid Out of 'Plug-In'", Aug. 15, 2005, http://www.greencarcongress.com/2005/08/solarpoweraugme.html, pp. 1-2.
Stanford News Service, News Release, Aug. 7, 2001, "Students race Route 66 in world's longest solar car challenge," pp. 1-3.

*Primary Examiner* — M'Baye Diao
(74) *Attorney, Agent, or Firm* — Fliesler Meyer LLP

(57) ABSTRACT

A connection system is provided to charge a high voltage battery (42) in an electric vehicle with multiple low voltage solar panels ($2_{1-n}$). The connection system includes sets of transmission lines (94) to individually connect each one of the solar panels ($2_{1-n}$) to each individual one of the battery cells ($34_{1-n}$) making up the battery (42). With the connection system the high voltage battery (42) can be charged by the lower voltage solar panels ($2_{1-n}$) without using a lossy DC-DC converter system that converts the DC solar panel output to AC for transforming to the much higher voltage across the primary terminals of battery (42) before converting back to DC to connect to the battery (42).

8 Claims, 9 Drawing Sheets

U.S. PATENT DOCUMENTS

| | | |
|---|---|---|
| 5,908,077 A | 6/1999 | Moore |
| 6,448,740 B1 | 9/2002 | Kirkpatrick |
| 6,583,522 B1 | 6/2003 | McNulty |
| 7,068,011 B2 | 6/2006 | Yang |
| 2002/0101097 A1 | 8/2002 | Muller |
| 2002/0146617 A1 | 10/2002 | Johnson |
| 2005/0057215 A1 | 3/2005 | Matan |
| 2005/0083722 A1 | 4/2005 | Emori |

FOREIGN PATENT DOCUMENTS

| | | |
|---|---|---|
| JP | 09-298843 | 11/1997 |
| JP | 2000 174308 A | 6/2000 |
| JP | 2001 309563 | 11/2001 |
| JP | 2003 339124 | 11/2003 |
| WO | WO 2004/049540 A2 | 6/2004 |

* cited by examiner

SOLAR PANEL CHARGING SYSTEM FOR ELECTRIC VEHICLE THAT CHARGES INDIVIDUAL BATTERIES WITH DIRECT PARALLEL CONNECTIONS TO SOLAR PANELS

CLAIM OF PRIORITY

This application is a Continuation-in-Part of U.S. patent application Ser. No. 12/033,591 filed Feb. 19, 2008, which was a continuation filed under 35 U.S.C. §111(a) for PCT Patent Application Number PCT/US2006/033166 with filing date 23 Aug. 2006, which claimed priority to U.S. Provisional Application Ser. No. 60/710,996 filed Aug. 24, 2005, U.S. Provisional Application Ser. No. 60/714,688 filed Sep. 6, 2005, and U.S. Provisional Application Ser. No. 60/816,956 filed Jun. 27, 2006, all of which are incorporated by reference herein in their entirety.

This application further claims priority to U.S. Provisional Application Ser. No. 61/291,700, with filing date of Dec. 31, 2009 entitled "Solar Panel Charging System For Electric Vehicle that Charges Individual Batteries With Direct Parallel Connections To Solar Panels" which is incorporated by reference herein in its entirety.

BACKGROUND

1. Technical Field

The present invention relates to a system for increasing the battery life for an electric vehicle. More particularly, the present invention relates to a system for increasing the fuel mileage for a hybrid vehicle by using solar energy.

2. Related Art

Electric vehicles are typically driven using charge stored in a battery, with the battery charged by an AC outlet plug in system. Hybrid vehicles are driven by a combination of a battery powered electric motor and a fuel burning motor. Batteries of the electric motor in either drive system can be recharged by regenerative braking to increase the miles the vehicle can travel per charge for a battery powered system alone, or the miles per gallon the vehicle can travel for a hybrid system. It is desirable to provide additional systems to charge the battery to increase the battery life for an electric vehicle, or the fuel mileage of a hybrid vehicle.

SUMMARY

Embodiments of the present invention provide a system for charging a vehicle battery using one or more solar panels. The solar panels can be included in the roof or otherwise attached to the vehicle. Hybrid systems typically operate with a high voltage battery, some on the order of 300 volts. A conventional low cost silicon solar cell of one square inch ($2.5^2$ centimeters) can produce approximately 0.5 volts. Solar cells connected in series to form a solar panel typically provide a voltage output on the order of 12 volts. Accordingly, embodiments of the present invention provide for charging the high voltage system (such as a 300 volt system) with one or more lower voltage solar panels. In embodiments of the present invention, a low voltage solar panel to high voltage charging system includes a series charger, enabling the solar panel to charge series connected battery cells on a cell-by-cell basis.

In one embodiment, a connection system of the present invention is provided to charge a high voltage battery with multiple low voltage solar panels. The connection system includes sets of transmission lines to individually connect each one of the solar panels to each individual one of the battery cells making up the vehicle battery. With each solar panel providing a higher voltage than each individual battery cell, even though it does not provide the voltage of the combined cells, it will still charge the individual cell. With this connection system the high voltage vehicle battery can be charged by the lower voltage solar panels without using a lossy DC-DC converter system that converts the DC solar panel output to AC for transforming to the much higher voltage to apply across the primary terminals of the battery.

In another embodiment, switches are included between each of the series battery cells making up the vehicle battery. When the vehicle battery is not in use to power the vehicle, the switches are opened, and a single solar panel can be connected in parallel with all of the isolated battery cells concurrently. With the single solar panel providing a higher voltage than each individual battery cell, each of the individual isolated battery cells can be charged by the single solar panel at the same time.

BRIEF DESCRIPTION OF THE FIGURES

Further details of the present invention are explained with the help of the attached drawings in which.

DETAILED DESCRIPTION

I. Electric or Hybrid Vehicle Solar Panel & Battery Placement

A. Solar Panel

Figure 1:
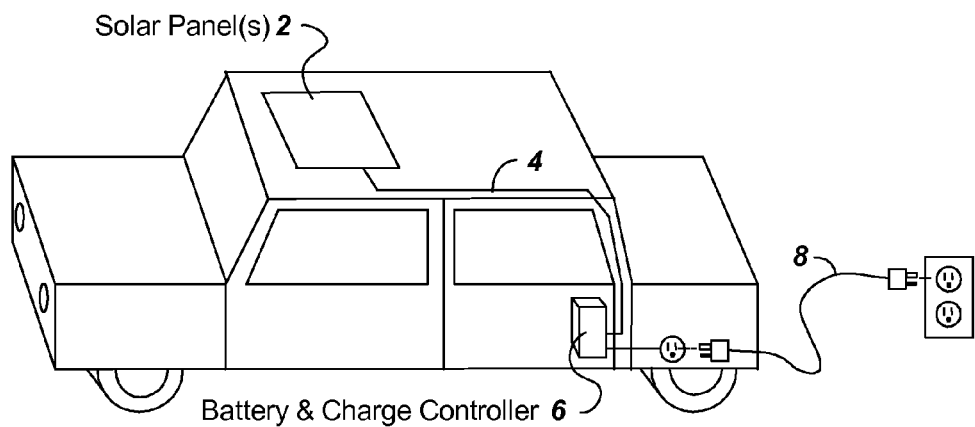
FIG. 1 illustrates solar panel placement on a vehicle along with wiring to a battery and charge controller.

FIG. 1 illustrates a vehicle with one or more solar panels 2 that can be used in embodiments of the present invention. The solar panels 2 can be provided to replace panels of a vehicle, be mounted on the vehicle, or provided inside the vehicle beneath a window. Examples of surfaces where a solar panel can be provided include a roof, trunk, moon roof and a pickup truck bed cover. Other modular panels include solar panels provided on sunshades, roof rail attachments, or roof top clamp on carriers. Since the solar panels typically produce a lower voltage than required for charging a high voltage battery pack of the vehicle, charging systems are provided in embodiments of the present invention to allow a low voltage solar panel to charge a high voltage battery.

The solar panels increase fuel mileage of a hybrid vehicle, or increase battery life of an electric vehicle by charging batteries in combination with regenerative braking FIG. 1 illustrates a vehicle showing one or more solar panels 2 placed in a portion of a roof panel. Although shown occupying a portion of the roof, the one or more solar panels can likewise cover the entire roof panel, or another panel of the car such as the trunk as indicated previously. Electric cables or wires 4 from the one or more solar panels 2 can be run through the vehicle to batteries and charge controller 6. The batteries and charge controller 6 can be placed behind a passenger seat or beneath the floorboard of the vehicle. Although shown combined, the battery and charge controller 6 can be provided separately and located in other parts of the vehicle either together or separately. Further, although the solar panel charging system is provided, a separate plug-in charging system 8 can still be used with the vehicle.

The above described solar panels 2 can be constructed from individual photovoltaic cells (PVCs) made of material such as silicon, gallium-arsenide, a copper alloy, or similar solar cell material electrically connected together to form a solar panel as desired to provide charge for an electric vehicle battery. To form the solar panel, the individual photovoltaic cells can be connected either in parallel to maximize current or series to maximize voltage. The solar panel can be rigid, or flexible, and can be formed as light weight thin film material as known in the art.

B. Battery Connection and Placement

The batteries for hybrid vehicles are typically placed in locations away from the passengers, such as behind the rear passenger seat as shown in FIG. 1, or beneath a floorboard cover. To store significantly more charge than can be provided by the original vehicle battery for the electric motor an additional battery or batteries can be used. The additional battery can be connected in parallel to supplement the original vehicle battery, or connected in series to form a battery pack sufficient to run a higher voltage motor. The additional battery can be provided in a similar location to the original battery, such as behind a rear passenger seat, or beneath a floorboard cover. Alternatively, with a solar system in a truck bed cover, the additional battery can be provided in the truck bed cover or in a tool box located in the truck bed. Although the term battery is used, battery as referenced herein is intended to describe either a rechargeable battery, a capacitor bank, a group of interconnected rechargeable batteries, or other charge storage devices.

Figure 2:
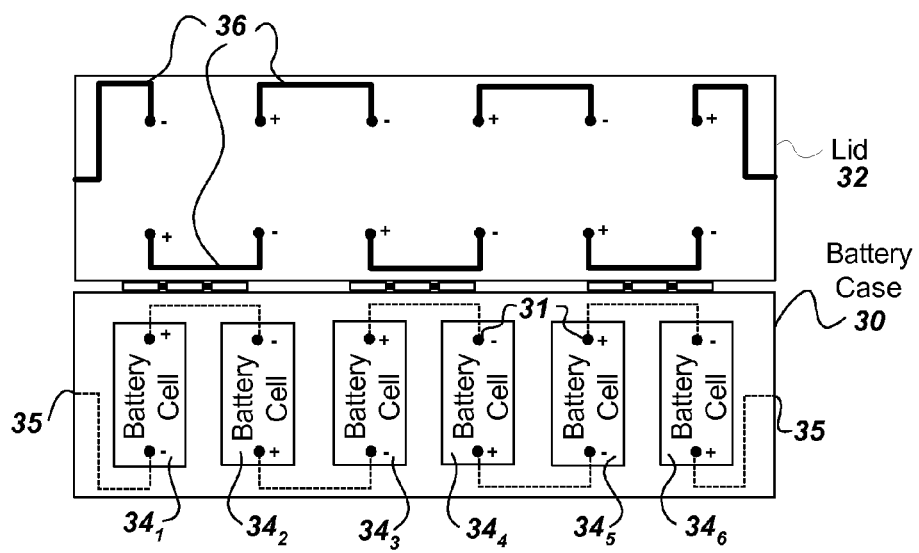
FIG. 2 illustrates a battery case with separate low voltage battery cells connected in series by circuitry on the case lid to provide a high voltage combined battery.

FIG. 2 illustrates a conventional hybrid vehicle battery case 30 with separate low voltage battery cells $34_{1-6}$ connected in series by circuitry on the case lid 32 to provide a high voltage combined battery. The battery pack shown includes a lid 32 with a circuit board having trace connections 36 connecting the cells in series. As an alternative to a circuit board, wiring can be provided to make battery connections. Although shown with a circuit board making a series connection in the lid of the battery cell container, it is understood that such a series connection system can be placed in other areas of the battery cell container.

The battery with individual series connected cells $34_{1-6}$ shown in FIG. 2 allows for connection to a solar charging system for charging of the high voltage battery with a low voltage charging system. A DC-DC converter can be connected across the main terminals 35 of the battery for charging the battery with a low voltage solar panel, potentially without removing the battery lid 32. In some embodiments of the present invention described subsequently, a series charger can be used to connect to terminals 31 of the individual battery cells $34_{1-6}$ for charging.

II. Solar Charging Systems

A. System Overview

Figure 3:
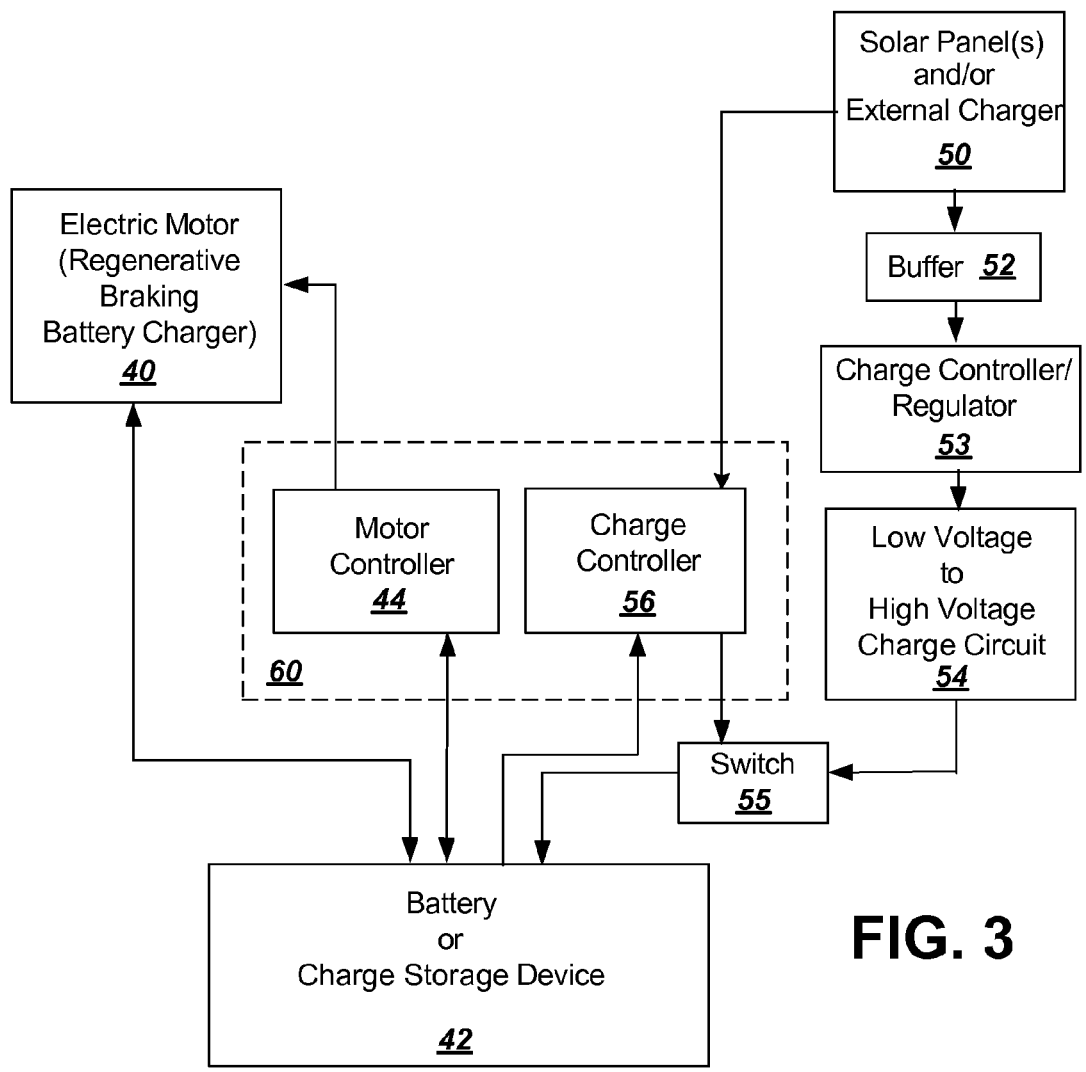
FIG. 3 shows a block diagram for a solar panel battery charging system in combination with a hybrid vehicle battery charging system.

FIG. 3 shows a block diagram of components for a solar panel charging system in combination with a hybrid vehicle electrical system according to embodiments of the present invention. FIG. 3 includes typical hybrid system components, including an electrical motor 40 for powering the vehicle that also provides for regenerative braking to charge batteries 42. The motor controller 44 switches the motor 40 so that it can be used to drive the vehicle when battery power is sufficient, and then return to charging the batteries 42 when braking or deceleration of the vehicle occurs.

Additionally in FIG. 3, in accordance with some embodiments of the present invention, a solar panel charging system is added to the system to charge the battery 42. Buffering 52 is provided between the solar panel(s) 50 and battery 42 to prevent current from the regenerative braking from damaging the solar panel(s) 50. The buffering 52 can be a simple diode.

The charge controller 53 is next provided in some embodiments to provide a stable voltage and current from the solar panel(s) 50, since with changing amounts of sunlight different voltage and currents can be provided. The charge controller 53 can provide an output only when sufficient voltage is provided from solar panel(s) 50. Alternatively, the charge controller 56 of FIG. 3 can monitor the solar panel(s) 50, taking the place of the charge controller/regulator 53 to provide a signal to allow turning on of the solar panel(s) 50 output to subsequent components when sufficient charge is provided from the solar panel 50. Although shown separately, the charge controller 66 and buffer 52 can be combined with the solar panel(s) 50.

A low voltage to high voltage charge circuit 54 further connects the solar panel(s) 50 to the battery 42 through switch 55. The switch 55, though shown adjacent the battery 42, can be provided in other locations between the battery 42 and solar panel 50. In some embodiments, such as when overcharge of the battery is not a concern, the switch 55 can be eliminated. As a further embodiment, additional buffering can be provided between the solar panel(s) 50 and the low voltage to high voltage charger 54, particularly if the charger circuit 54 can be damaged from current from the electric motor 40.

The charge controller 56 is further shown in the solar panel charging system, although in some embodiments, such as when controls are provided in circuits such as the charger circuit 54, the charge controller 56 may be unnecessary. The charge controller 56 can be a processor, an application specific circuit, a programmable logic device, a digital signal processor, or other circuit programmed to perform the functions described to follow.

Initially, the charge controller 56 can control switch 55 to close to allow the solar panel 50 to connect to charge the battery 42, whether or not the electric motor 40 is operating. Solar charging during vehicle operation is beneficial because charging can occur during long stretches of highway driving when no regenerative braking is applied so that the batteries 42 can still be charged and the electric motor 40 used to boost fuel mileage. Although charging of the battery 42 when the vehicle is running is beneficial, charging when the vehicle is turned off is also beneficial, for example when a vehicle is parked at a commuter parking lot all day, or for taxis that may wait in the sun for a long time for a fare, since the battery 42 can be fully charged by solar power for use when the vehicle is later operated.

The charge controller 56 can further function to connect and disconnect the switch 55 to prevent overcharging of the batteries 42. In some embodiments, hysteresis is provided between charge levels of the battery 42 when the solar panel(s) 50 are disconnected and later reconnected. The hysteresis will prevent continuous turn on and turn off of the solar charging system when charging is near a turn on-turn off threshold. In one embodiment, with the vehicle parked for a long period of time, such as a week or more, the controller 56 can monitor charge on the battery 42 and the vehicle operation state and disconnect the switch 55 to turn off the solar charging system until an operator returns to prevent unnecessary charging of the battery 42 that could reduce battery life.

The charge controller 56 can further function to disconnect the switch 55 in one embodiment depending on the amount of sunlight available to enable charging at a sufficient voltage level. Particularly without a charge controller/regulator 53, the solar panel controller 56 can connect switch 55 only when sufficient power is provided from the solar panel 50 to provide more efficient battery charging, and to prolong the battery life.

The charge controller 56 can further control the low voltage to high voltage charge circuit 54 when it is a series charger with switching, as described subsequently, to connect the solar panel 50 to successive individual battery cells.

The charge controller 56 can further operate in conjunction with non-solar charging systems. Thus, the element 50 is labeled as a solar panel and/or external charger. For example, the system 50 can be an AC wall plug-in to an electrical outlet that can be provided for nighttime battery charging of the battery 42 that operates in conjunction with the solar charging system. Likewise, the AC wall plug can be provided without the solar panel as system 50. The AC wall plug in or other electrical charging device such as a wind turbine used for system 50 could benefit from the low voltage to high voltage charge circuit 54 if their voltage output is significantly lower than the battery 42. An AC wall plug-in that provides a high enough voltage without the low voltage to high voltage charge circuit 54 could directly connect to the battery 42 without going through the high voltage charge circuit 54 and be provided in conjunction with the solar panel charging system of FIG. 3 as illustrated by plug-in connection 8 of FIG. 1. The charge controller 56 can include an AC to DC converter to adapt between AC systems, such as an AC plug-in or a wind turbine and the DC battery 42. The charge controller 56 can further control turn on and turn off of such a separate charging system 50 to prevent overcharge to the battery 42, or to control charge output from the charging system 50 and the switch 55 eliminated in some embodiments.

In some embodiments, the charge controller 56 can be combined with the hybrid controller 44 to form a joint controller 60. Although the joint controller 60 provides less total components, the separate charge controller 56 and other solar charging components can easily be added to a hybrid vehicle after market since the hybrid system processor will not need reprogramming or connecting to solar system components.

B. Low Voltage to High Voltage Charging Systems

The solar panel(s) 50 with conventional solar cells occupying a small area, such as on the roof of a vehicle, may not provide sufficient voltage to allow charging of a high voltage battery 42. Typical solar systems currently available include solar cells of approximately 0.5 volts and a few milliamps per 1 cm square cell. The solar cells forming a solar panel are connected in series so that the voltages are added together to form a 6 to 12 volt system, or possibly a larger voltage if space is available where solar cells are placed. Typical hybrid systems used by auto manufacturers include battery packs ranging from approximately 50 volts where the auto engine is not driven by an electric motor, to a 150 volt battery for a small auto engine propelling motor, approximately 350 volts for a higher power motor, and approximately 500 volts for the current highest power motor. Accordingly, as indicated above, in embodiments of the invention the low voltage to high voltage charge circuit 54 is used to connect the solar panel(s) 50 to the battery 42.

Embodiments of the present invention of the low voltage to high voltage charge circuit 54 can be a series charger using either a switching system or a direct connection system, as described to follow, so that the low voltage solar panel(s) 50 are connected individually to each low voltage series cell in the battery 42 to enable battery charging.

1. DC-DC Converter Charging System

Figure 4:
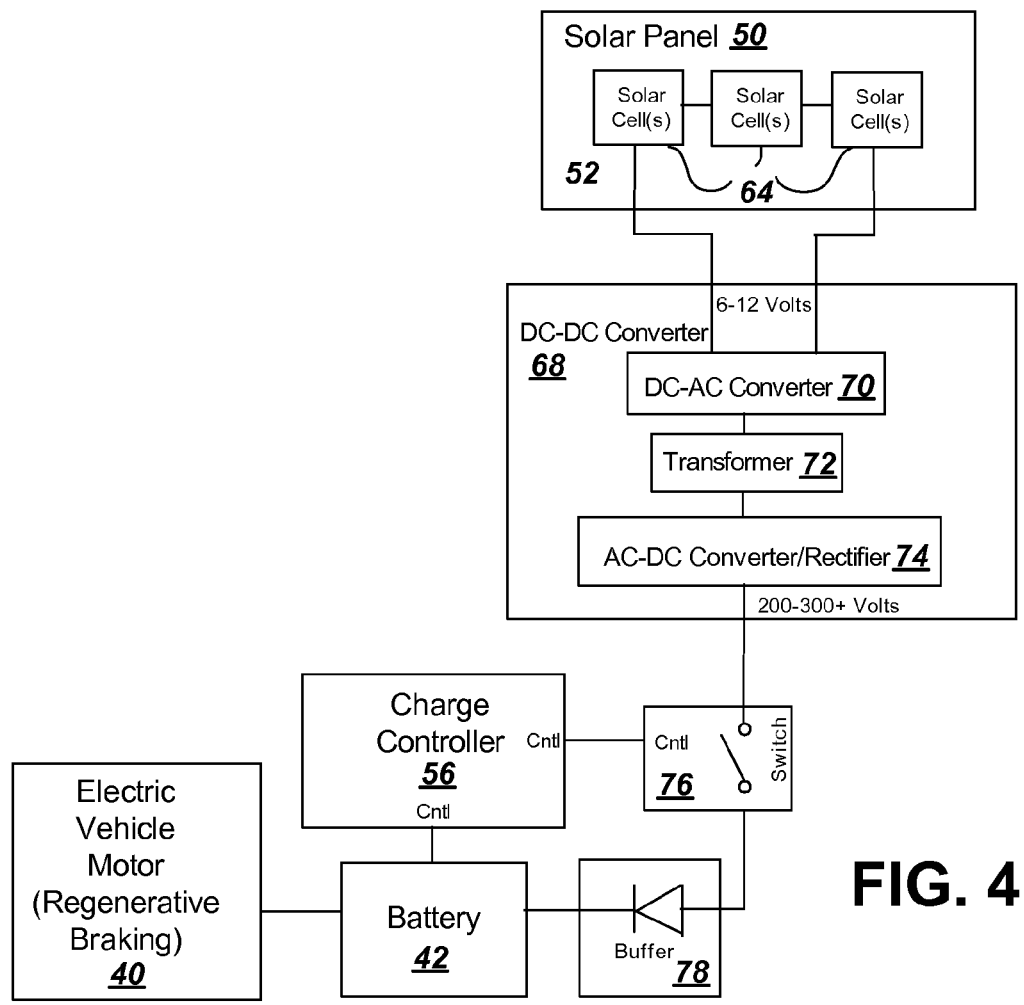
FIG. 4 shows a block diagram for components of a solar battery charging system for use with an electric vehicle with regenerative braking that uses a DC-DC converter to increase voltage from a low voltage solar panel to a high voltage battery.

FIG. 4 illustrates components of a solar charging system that uses a DC-DC converter 68 for the low voltage to high voltage charge circuit 54 of FIG. 3. The solar charging system shown includes a single solar panel circuit 50 that includes several series connected solar cells 64. Although buffer 52 and charge controller 53 of FIG. 2 may be included in FIG. 3, or subsequent described circuit configurations, they are not shown here. Note that components carried over from FIG. 3 are similarly labeled in FIG. 4, as will be components carried over in subsequent drawings.

In FIG. 4, The DC-DC converter 68 provides the low voltage to high voltage charge circuit 54 of FIG. 3. The DC-DC converter 68 can contain the minimal components shown including: (1) a DC to AC converter or inverter 70, (2) a transformer 72, and (3) an AC to DC converter or rectifier 74. The DC to AC converter 70 serves to convert the low voltage output of the solar panel 50 to an AC signal. The transformer 72 boosts the AC voltage to a higher AC voltage than the battery 42 as necessary to charge the battery 42, and the rectifier 74 converts the high voltage AC to DC to enable charging of the battery 42. Since the regenerative braking charging system between the electric motor 40 and battery 42 will typically use a similar rectifier to rectifier 74, in one embodiment a common rectifier can be used to reduce overall circuitry. Other alternative components known in the art can be used in the DC-DC converter 68.

The charge controller 56 is connected to monitor charge on the battery 42 and control switch 76. To prevent overcharging of the battery 42, the charge controller 56 opens the switch 76 to disconnect the solar panel 50. The solar charging controller 56 can further disconnect the switch 76 if charging from the solar panel 50 might interrupt operation of the vehicle, or if significant current from the electric motor might damage components of the solar charging system. As indicated previously, the switch 76 can be moved to an alternative location between the battery 42 and solar panel 50.

The high voltage battery 42 in FIG. 4 is created by connecting a large number of smaller batteries in series as shown in FIG. 2. Although shown with a single line, two terminals connect from the solar panel 50 through each component to the battery 42 in FIG. 4. The two terminals from the buffer (or one buffer connecting each terminal) then connect across the primary end terminals 35 of the battery 42.

2. Series Battery Cells Switched Charging System

Figure 5:
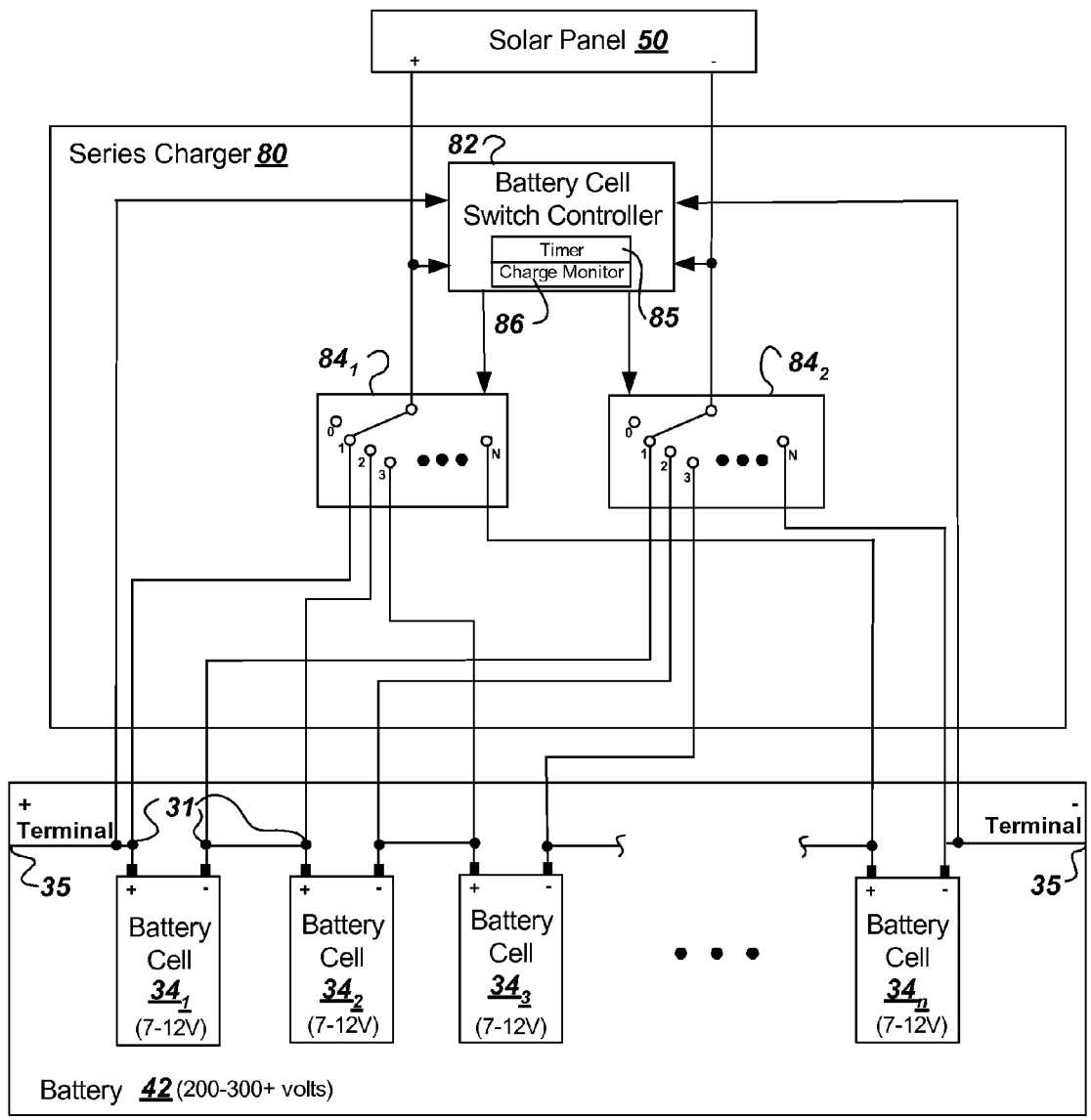
FIG. 5 illustrates a series battery charger using switches to enable charging of a high voltage battery by a low voltage solar panel.

FIG. 5 illustrates another embodiment of a battery charger system 80, termed a series battery charger, used for the low voltage to high voltage charging circuit 54 of FIG. 3 that uses a set of switches to interconnect the solar panel 50 to battery 42. The series battery charger system 80 provides an alternative to the less efficient DC-DC converter used in prior art solar charging systems. The DC-DC converter typically will experience less than 80% of the efficiency of a series charger 80 due to the loss through a transformer of the DC-DC converter.

The series charger 80 serves to charge a high voltage battery pack 42 (200-300+ volts) made up of series connected battery cells $34_{1-n}$. The individual battery cells $34_{1-n}$ can in one non-limiting example be approximately 10 volts each with thirty connected in series to create a 300 volt battery. The series charger 80 makes a connection of the solar panel 50 in parallel with the series battery cells $34_{1-n}$, one or more at a time using switches $84_1$ and $84_2$ connected to terminals of the solar panel 50. The solar panel 50 used is a single solar panel with series connected solar cells similar to those illustrated in FIG. 4. The switches $84_1$ and $84_2$ can be electronic switches, relays, transistors, pass gates, tri-state buffers, or other components known in the art used to accomplish switching.

In operation, during charging by the series charger 80, the solar panel 50 can be connected in parallel across the series connected battery cells $34_{1-n}$ one at a time by moving the position of switches $84_1$ and $84_2$ from position 1, 2, 3 etc. across the battery cells $34_{1-n}$ without any DC-DC conversion. As an alternative to connecting the solar panel 50 across one of the battery cells, the switches $84_1$ and $84_2$ can connect across multiple ones of the battery cells $34_{1-n}$, for example by connecting switch $84_1$ to position 1, while switch $84_2$ is connected at position 2. Although not specifically shown, it is noted that each of the battery cells $34_{1-n}$ can each include a number of series connected cells. The charging can be performed when the vehicle ignition is off and the electric motor not operating, or when the electric motor is not in use. Charging can also be performed during operation of the vehicle during application of regenerative braking with sufficient buffering applied to the solar panel 50 and components of the series charger 80 if necessary.

The series charger 80 further includes an individual battery cell switch controller 82. The cell switch controller 82 shown includes components to regulate charging of the individual series battery cells $34_{1-n}$. The cell switch controller 82 can monitor charge on a battery cell being charged using a cell charge monitor 86 and control switches $84_1$ and $84_2$ to charge another one of the battery cells when sufficient charging has occurred. Alternatively, the cell charge controller 82 can include a timer 85 and switch from battery cell to battery cell on a timed basis to perform charging. Once all of the cells $34_{1-n}$ are sufficiently charged, as determined by the controller 82 monitoring the terminals 35 of the entire battery 42, the cell switch controller 82 can move the switches $84_1$ and $84_2$ to the open circuit switch position 0 to prevent overcharging of the battery 42. As described previously, hysteresis can be provided with the cell switch controller 82 allowing the battery 42 to discharge below the maximum charge state before the switches $84_1$ and $84_2$ are moved back off of the 0 position to avoid rapid turn on and off of the charging system when full battery charge is reached.

Further, although not shown in FIG. 5, a charge controller regulator such as the regulator 53 described with respect to FIG. 3 can be connected between the solar panel 50 and series charger 80 to maintain a constant charging voltage during operation. Such a regulator can likewise be used in subsequent figures showing series charging systems, although not specifically shown. In one embodiment, the cell switch controller 82 can determine the total voltage produced by the solar panel 50, potentially based on a charge regulator output, and adjust the number of the cells $34_{1-n}$ being charged at one time based on the voltage produced from solar panel 50.

3. Switched Charging System with Additional Switches

Figure 6:
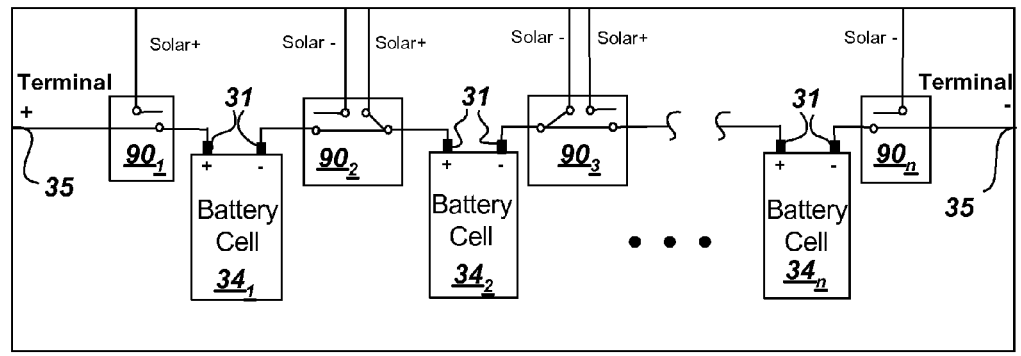
FIG. 6 shows an alternative switch configuration to the configuration of FIG. 5 for a series battery charger.

FIG. 6 shows an alternative to the configuration of switches $84_1$ and $84_2$ of FIG. 5 for a series battery charger. Instead of the two single pole multiple throw switches $84_1$ and $84_2$, the alternative switches include single pole single throw switches $90_{1-n}$ connected to terminals 31 between each one of the cells $34_{1-n}$. Although the end switches $90_1$ and $90_n$ include a single switch, while the middle switches, such as $90_2$, includes two combined switches, it is understood that the middle switches can each be separated into two single pole single throw switches. The switches $90_{1-n}$ selectively connect terminals 31 of the battery cells $34_{1-n}$ to terminals of the solar panel 50. For purposes of illustration, the battery cell $34_2$ is shown connected by switches $90_1$ and $90_3$ to the solar panel for charging, while the remaining battery cells are disconnected. The indications solar− and solar+ show connections to specific terminals of the solar panel 50. The alternative switches $90_{1-n}$ of FIG. 6 illustrate that different switch configurations can be provided to accomplish the same function of connecting the solar panel 50 in parallel across individual ones of the cells $34_{1-n}$, one or more of the cells at a time.

Figure 7:
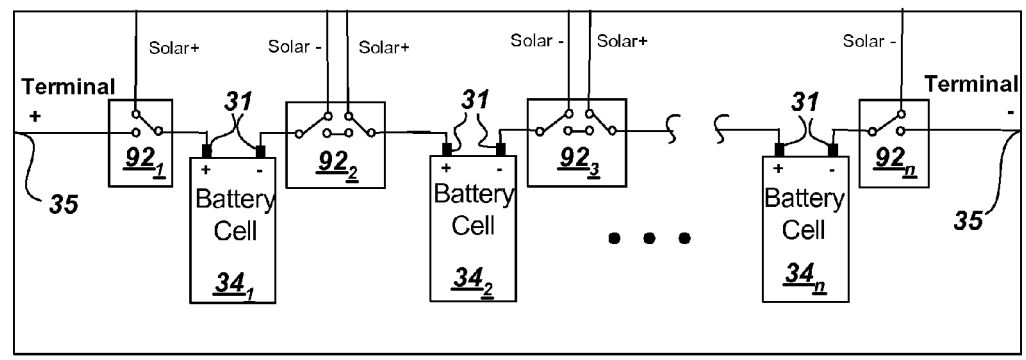
FIG. 7 illustrates an embodiment for a series battery charger wherein the series connection of individual battery cells in a battery pack are broken and the solar panel is connected in parallel with all of the battery cells to enable charging of the battery cells concurrently.

FIG. 7 illustrates an embodiment for a series battery charger wherein connection to the solar panel 50 as well as the series connections of individual battery cells $34_{1-n}$ is made using switches $92_{1-n}$. The switches $92_{1-n}$ are single pole double throw switches (although the middle switches, such as $92_2$, are shown as double pole double throw switches they can be separated into two single pole double throw switches.) The switches $92_{1-n}$ illustrate that the series connection between battery cells $34_{1-n}$ can be broken and a single solar panel 50 connected by its terminals (solar+ and solar−) in parallel across all of the battery cells $34_{1-n}$ concurrently to enable charging of all the battery cells $34_{1-n}$ at the same time.

The disconnection of battery cells $34_{1-n}$, as shown in FIG. 7, by switches $92_{1-n}$ can be performed when the vehicle is not in operation to prevent danger of shock from high voltages, even if the solar panel is not charging. In one embodiment, an inertia shock sensor can be used to switch off the series connection, requiring the ignition to turn off and back on to reset. This can remove high voltages that make rescue dangerous after an accident. During operation of the vehicle, the series connections can then be reconnected by switches $92_{1-n}$ to recreate the 200-300+ volt battery output and the solar panel terminals, solar− and solar+, are disconnected from the battery cells $34_{1-n}$ to stop battery charging during vehicle operation.

In alternative embodiments, combinations of the series charging systems of FIGS. 5-7 can be provided as desired. For example, the switching systems for series charging one cell at a time in FIG. 5 can be combined with the system of FIG. 7 that charges all cells together when the battery cells are not used and are disconnected in series. This combination will still allow charging of the battery cells even when the series connection is made.

For the series charging systems shown in FIGS. 5-7, the switches can be provided on a circuit in the lid of the battery case shown in FIG. 2, or they can be provided in a separate housing with interconnecting wiring. Further, although the series charging systems shown in FIGS. 5-7 are described for use with a solar panel providing charge, the series charger switching systems can be used to charge batteries systems other than solar panels, such as with AC plug in system described previously.

4. Series Battery Cells Direct Connect Charging System

Figure 8:
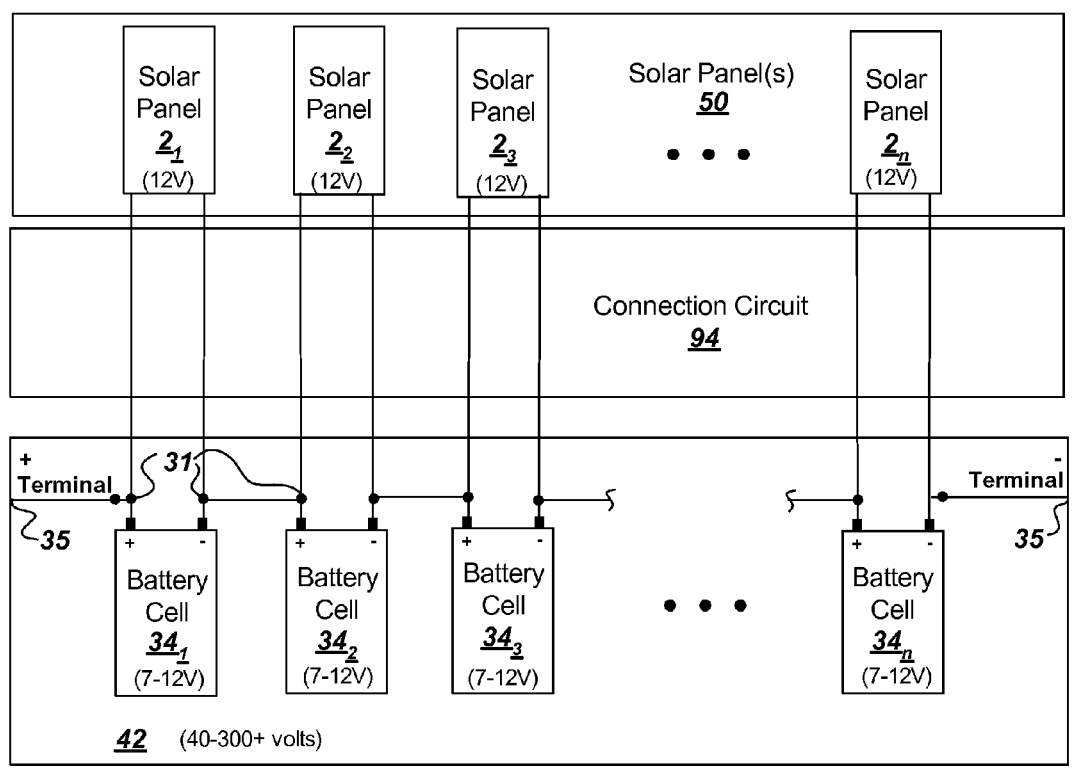
FIG. 8 shows an embodiment of the series battery charger with multiple solar panels, each solar panel being separately connected in parallel with a separate series connected battery cell.

FIG. 8 shows an alternative series charging embodiment of the present invention that eliminates the need for the switches of the system of FIGS. 5-7. The system of FIG. 8 uses multiple solar panels $2_{1-n}$ for the charger 50 in the system of FIG. 3 to accomplish the elimination of switches. In FIG. 8 with multiple solar panels 50, each solar panel $2_{1-n}$ in the solar panels 50 is separately connected by wires in parallel with a respective separate series connected battery cell $34_{1-n}$ of battery 42. In this manner, only connection wires 94 are needed for the low voltage to high voltage charge circuit 54 and switches or DC-DC converter circuitry are unnecessary. With the connection scheme shown in FIG. 8, the low voltage solar panels $2_{1-n}$ (shown as 12V) can charge the similar voltage battery cells $34_{1-n}$ to charge the entire high voltage battery 42.

With the solar panel connection shown in FIG. 8, charging by the solar panels $2_{1-n}$ will not affect operation of the battery 42 to propel the electric motor 40, shown in FIG. 3, or for the battery 42 to be charged by regenerative braking current from electric motor 40. Diodes connecting the solar panels $2_{1-n}$ to the battery cells $34_{1-n}$ will prevent current flow to the solar panels $34_{1-n}$ during charging of battery 42 by regenerative braking And the individual battery cells $34_{1-n}$ remain connected in series to supply current while the battery 42 runs the high voltage electric motor 40 without being effected by the connected solar panels $2_{1-n}$.

Figure 9:
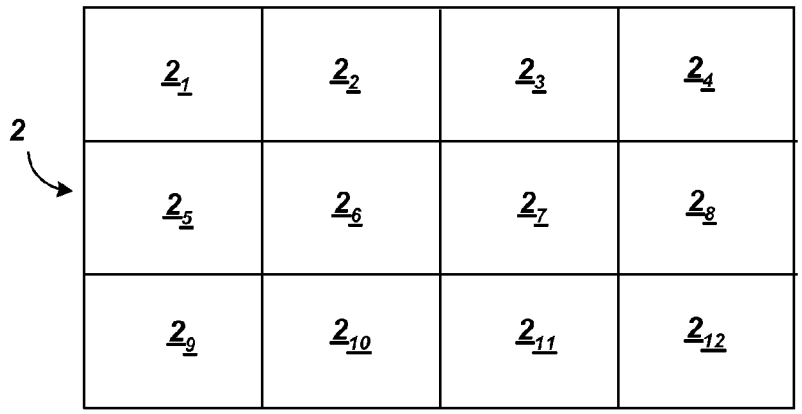
FIG. 9 shows separate solar panels making up the solar panel(s) of FIG. 1 that can be used in the circuit of FIG. 8.

FIG. 9 shows how separate solar panels $2_{1-12}$ make up the solar panel(s) 2 of FIG. 1 that can be used in the circuit of FIG. 8. Unlike a typical solar panel used on a vehicle that is formed by connecting all solar cells in series to form only one low voltage solar panel, the solar cells of solar panels $2_{1-12}$ shown are contemplated to generate enough power to supply on the order of 12 volts each. Embodiments of the present invention allow for connection of these low voltage solar panels $2_{1-12}$ so that charging of the high voltage battery 42 (on the order of 40 to 300+ volts) can be accomplished.

Figure 10:
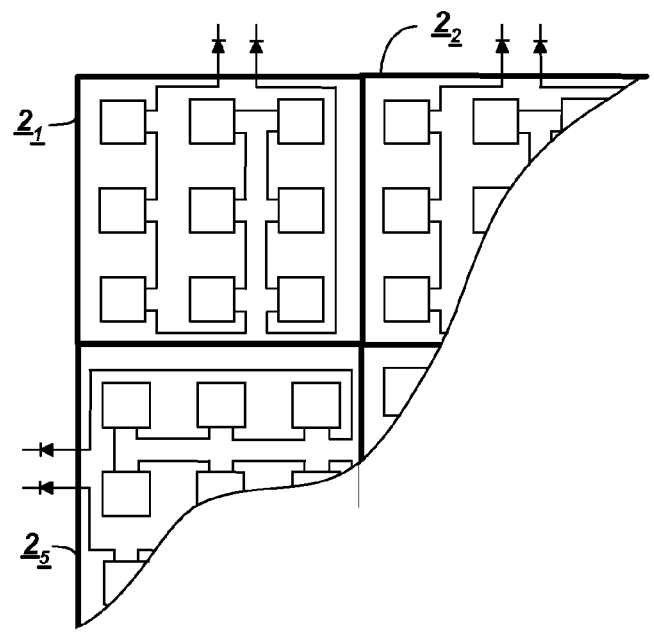
FIG. 10 is a cut away view showing how solar cells make up the individual solar panels of FIG. 9.

FIG. 10 is a cut away view showing how solar cells make up the individual solar panels $2_1$, $2_2$, and $2_5$ of FIG. 9. As shown in FIG. 9, the solar cells of each solar panel $2_1$, $2_2$, and $2_5$ are connected in series and each provide a separate set of power output leads through protective diodes.

Figure 11:
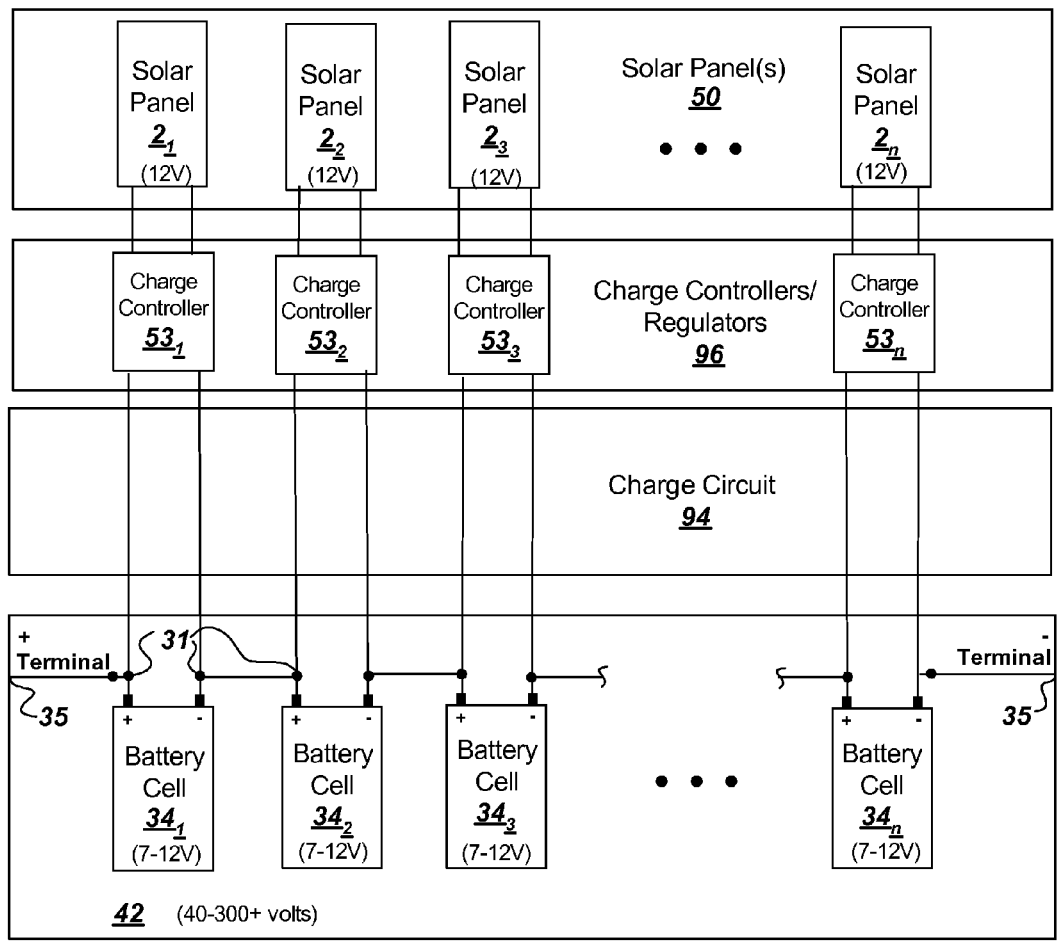
FIG. 11 illustrates how charge controllers can be placed in the path between the solar panels and the battery cells in the embodiment of FIG. 8.

FIG. 11 illustrates how charge controllers/regulators 96 can be placed in the path between the solar panels $2_{1-n}$ and the battery cells $34_{1-n}$ in the circuitry of FIG. 8. The charge controllers/regulators 96 can function similar to the charge controller/regulator 53 of FIG. 3. The charge controllers/regulators 96 provide a stable voltage and current from the solar panels 50, since with changing amounts of sunlight different voltage and currents can be provided. The charge controller/regulators 96 can also provide an output only when sufficient voltage is provided from solar panel(s) 50. The charge controller 56 of FIG. 3 can further turn off the solar panel output to prevent overcharge of the battery cells.

The circuitry of FIG. 11 illustrates that the connection between the solar panels 50 and the battery 42s can have intervening components. The overall theme, however, of avoiding a lossy DC-AC-DC converter to boost the voltage is avoided. A direct DC path without AC coupling components such as a transformer is provided from the solar panels to the battery cells.

5. Alternative Connection Systems

Figure 12:
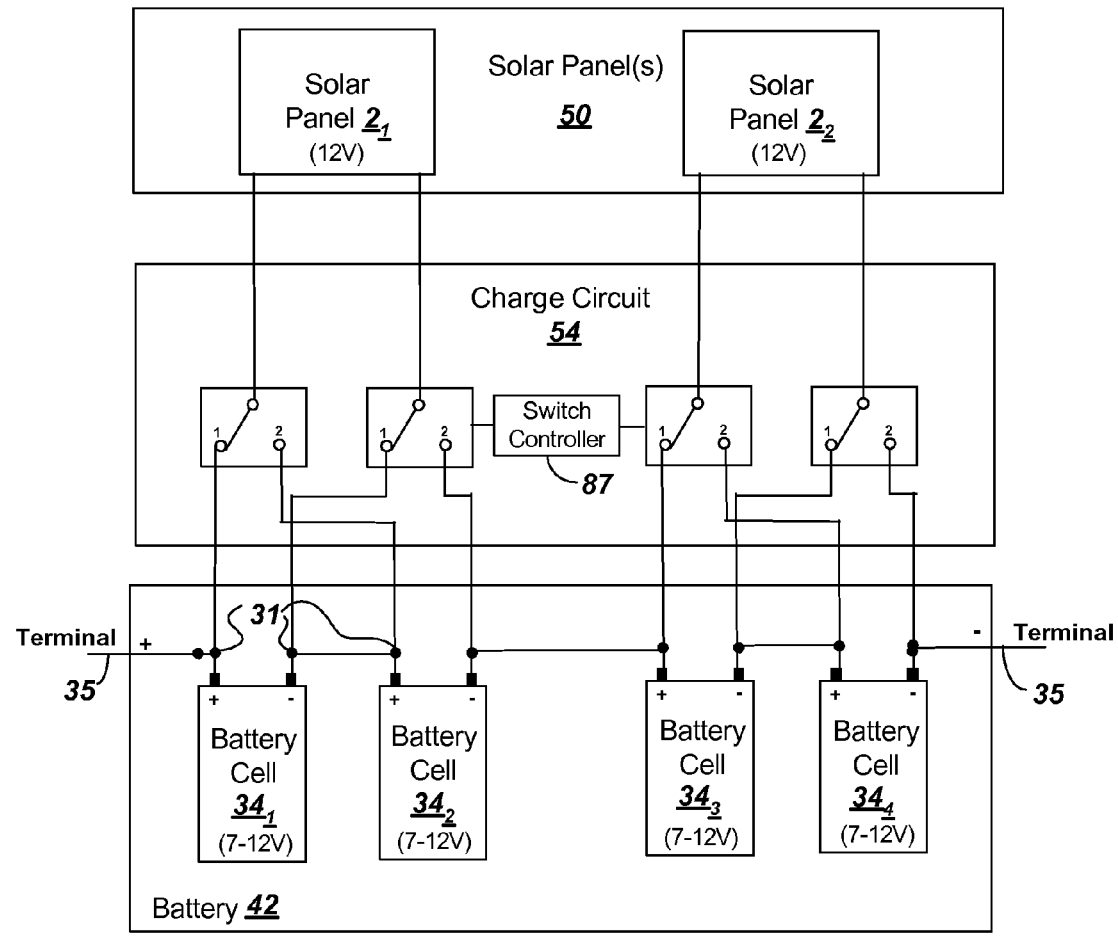
FIG. 12 shows an embodiment combining the configurations of FIGS. 5 and 8 that uses less solar panels than series connected battery cells and a switching system to separately connect the solar panels to individual battery cells over time for charging the battery cells.

FIG. 12 shows an alternative embodiment of the present invention that combines the direct connect features of FIG. 8 with the switching system of FIG. 5. The system of FIG. 12 can be used when less solar panels are available than the total number of battery cells. In the system of FIG. 12, series connected battery cells $34_{1-4}$ making up battery 42 are connected by a switching system in the low voltage to high voltage charge circuit 54 to separately connect two solar panels $2_{1-2}$ to the individual battery cells $34_{1-2}$ over time for charging the battery cells.

In FIG. 12, switches are included in the charge circuit 54 that individually connect the solar panels $2_{1-2}$. Solar panel $2_1$ is connected to be switched between battery cells $34_{1-2}$, while solar panel $2_2$ is connected to be switched between battery cells $34_{3-4}$. The switching is controlled by switch controller 87, which may be the timer 85 or charge monitor 86 of FIG. 5, so that all of the battery cells $34_{1-4}$ can be charged. As with previously described embodiments of the present invention, with individual solar panels $2_{1-2}$ connected in parallel with one of the battery cells $34_{1-4}$ the battery 42 will not interrupt powering of an electric motor 40 by battery 42, or charging of battery 42 by regenerative braking from electric motor 40. Although only two solar panels $2_{1-2}$ in the charging system 50 are shown powering four battery cells $34_{1-4}$ it is contemplated that additional solar panels might be provided to power a different number of battery cells in battery 42.

Although FIG. 12 shows one combination of the configurations of FIGS. 5 and 8, other combinations of the circuitry of FIGS. 5-8 are. For instance, the switches $90_{1-n}$ of FIG. 6 can be used to disconnect individual solar panels in the circuit of FIG. 8 rather than including the circuitry in separate charge controller/regulators 96 as in FIG. 11. Further, the switches $92_{1-n}$ between the battery cells $34_{1-n}$ of FIG. 7 used to disconnect individual battery cells $34_{1-n}$ could be used with the circuit of FIG. 8 if isolation or bypassing of battery cells is desirable.

Alterable solar panel configurations could be provided in some embodiments. Although one interconnection of solar cells forming solar panels is shown in FIG. 10, other configurations are possible. Switches can be included between the solar cells to accomplish the alterable configurations. For instance, switches could be included between the solar panels shown in FIGS. 9 and 10 to enable the solar panels to be connected together in series when enough energy is provided from sunlight to enable the combined solar panels to charge across the primary terminals of the entire battery 42. When sunlight is reduced, the solar panels can then be disconnected and used individually to charge individual battery cells $34_{1-n}$. To accomplish this system, switches can be included between the solar panels $2_{1-n}$ and battery cells $34_{1-n}$ to enable the solar panels to be connected together across the primary terminals of battery 42 or disconnected from the primary terminals of battery 42 and connected to battery cells $34_{1-n}$. Switches between solar panels or groups of solar cells can further enable damaged solar panels or solar cells to be bypassed.

Although embodiments of the present invention have been described above with particularity, this was merely to teach one of ordinary skill in the art how to make and use the invention. Many additional modifications will fall within the scope of the invention, as that scope is defined by the following claims.

What is claimed is:

1. A solar battery charging system for a vehicle comprising:
   an electric motor for braking and propelling the vehicle;
   a battery connected to the electric motor, the battery comprising series connected battery cells;
   solar panels each having an output voltage lower than the voltage of the battery; and
   a charge connection system comprising:
   electrical connection line sets each connecting one of the solar panels in parallel with an individual one of the battery cells while the battery cells remain connected in series, and while the electric motor can act as a generator to supply power to the battery during the braking or a load to draw power from the battery during the propelling of the vehicle;
   and charge controllers each connecting one of the solar panels to one of the electrical connection lines sets, each of the charge controllers controlling power provided from each of the solar panels to predetermined levels.

2. The solar battery charging system of claim 1, further comprising a plug-in charge connection across primary terminals of the battery wherein the plug-in charge connection allows charging of all the battery cells of the battery using an AC power source connection.

3. The solar battery charging system of claim 1, wherein the solar panels each comprise solar cells connected together to provide charge across terminals of one of the battery cells.

4. The solar battery charging system of claim 3, wherein the solar panels are provided together on a single support structure.

5. A method of charging a vehicle with an electric motor comprising:
   controlling the electric motor to brake and propel the vehicle;
   providing a battery connected to the electric motor, the battery including series connected battery cells;
   providing solar panels each having an output voltage lower than the voltage of the battery; and
   connecting the terminals of each of the solar panels in parallel with an individual one of the battery cells, while the battery cells remain connected in series, and while the electric motor acts as a generator to supply power to the battery during the braking or a load to draw power from the battery during the propelling of the vehicle; and
   providing a controller between each of the solar panels and the individual battery cells, the controllers controlling the amount of power provided from each of the solar panels to predetermined levels.

6. The method of claim 5, further comprising:
   providing a plug-in charge connection across primary terminals of the battery wherein the plug-in charge connection allows charging of all the battery cells of the battery using an AC power source connection.

7. The method of claim 5, wherein the solar panels each comprise solar cells connected together to provide charge across terminals of one of the battery cells.

8. The method of claim 7, wherein the solar panels are provided together on a single support structure.

* * * * *